United States Patent
Nishiuchi (10) Patent No.: US 7,812,931 B2
(45) Date of Patent: Oct. 12, 2010

(54) DISTANCE MEASUREMENT METHOD AND DEVICE AND VEHICLE EQUIPPED WITH SAID DEVICE

(75) Inventor: Hidekazu Nishiuchi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 246 days.

(21) Appl. No.: 12/186,848

(22) Filed: Aug. 6, 2008

(65) Prior Publication Data

US 2009/0040500 A1    Feb. 12, 2009

(30) Foreign Application Priority Data

Aug. 6, 2007   (JP) ............................. 2007-204218

(51) Int. Cl.
*G01C 3/08* (2006.01)

(52) U.S. Cl. .................... 356/3.11; 356/3.01; 356/3.1; 356/3.15; 356/4.01; 356/4.1

(58) Field of Classification Search ........ 356/3.01–28.5
See application file for complete search history.

(56) References Cited

U.S. PATENT DOCUMENTS 6,968,073 B1 * 11/2005 O'Boyle et al. ............. 382/104
2003/0209893 A1 * 11/2003 Breed et al. ................. 280/735

FOREIGN PATENT DOCUMENTS

JP    2002-131031    5/2002

* cited by examiner

*Primary Examiner*—Thomas H Tarcza
*Assistant Examiner*—Luke D Ratcliffe
(74) *Attorney, Agent, or Firm*—Young Basile (57) ABSTRACT

A method for measuring the distance of an object is provided that includes irradiating a plurality of light beams having predetermined wavelengths and then in a first round, picking up an image under irradiation of the plurality of light beams and in another round picking up the image without irradiation using a camera. The difference of the image between the first and other round is fed to an observation region part and to an irradiation angle computing part and then the distance to the object is computed.

21 Claims, 8 Drawing Sheets

DISTANCE MEASUREMENT METHOD AND DEVICE AND VEHICLE EQUIPPED WITH SAID DEVICE

CROSS-REFERENCE TO RELATED APPLICATION

This application claims priority from Japanese Patent Application Serial No. 2007-204218, filed Aug. 6, 2007, which is incorporated herein in its entirety by reference.

TECHNICAL FIELD

The invention pertains to distance measurement technology for measuring the distance information of an object by irradiating light for measurement on the object. Also, the invention pertains to a type of sedan or other vehicle using said distance measurement technology.

BACKGROUND

In certain distance (shape) measurement devices, light is irradiated on the measurement object space, and the reflected light from the object is picked up by a CCD or another image pickup device. The picked up information is processed, and the distance to the object and the shape of the object are measured by the measurement device. As a scheme of such a measurement device, during the exposure time for 1 frame of the camera, slit light beams with an irradiated light quantity depending on the irradiating direction are irradiated on the measurement object space. Then, from the image picked up by the camera, the irradiating direction of the slit light beams is computed for each pixel from the variance of the exposure quantity by irradiation of the slit light beams.

Japanese Kokai Patent Publication Application No. 2002-131031 discloses a measurement device, based on the irradiating direction of the slit light beams computed for each pixel, the image pickup direction of each pixel, and the relationship between the position of the light source of the slit light beams and the position of the camera. The distance to the point or face of the object irradiated with the slit light beams is computed based on the principle of triangulation. From the distance information for all of the pixels of the camera computed in this way, the three-dimensional shape of the object in the measurement object space is measured.

BRIEF SUMMARY

A method is disclosed herein for measuring the distance of an object that includes irradiating a plurality of light beams having predetermined wavelengths, and then in a first round, picking up an image under irradiation of the plurality of light beams and in another round picking up the image without irradiation using a camera. The difference of the image between the first and other round is fed to an observation region extracting part and to an irradiation angle computing part, and then the distance to the object is computed.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
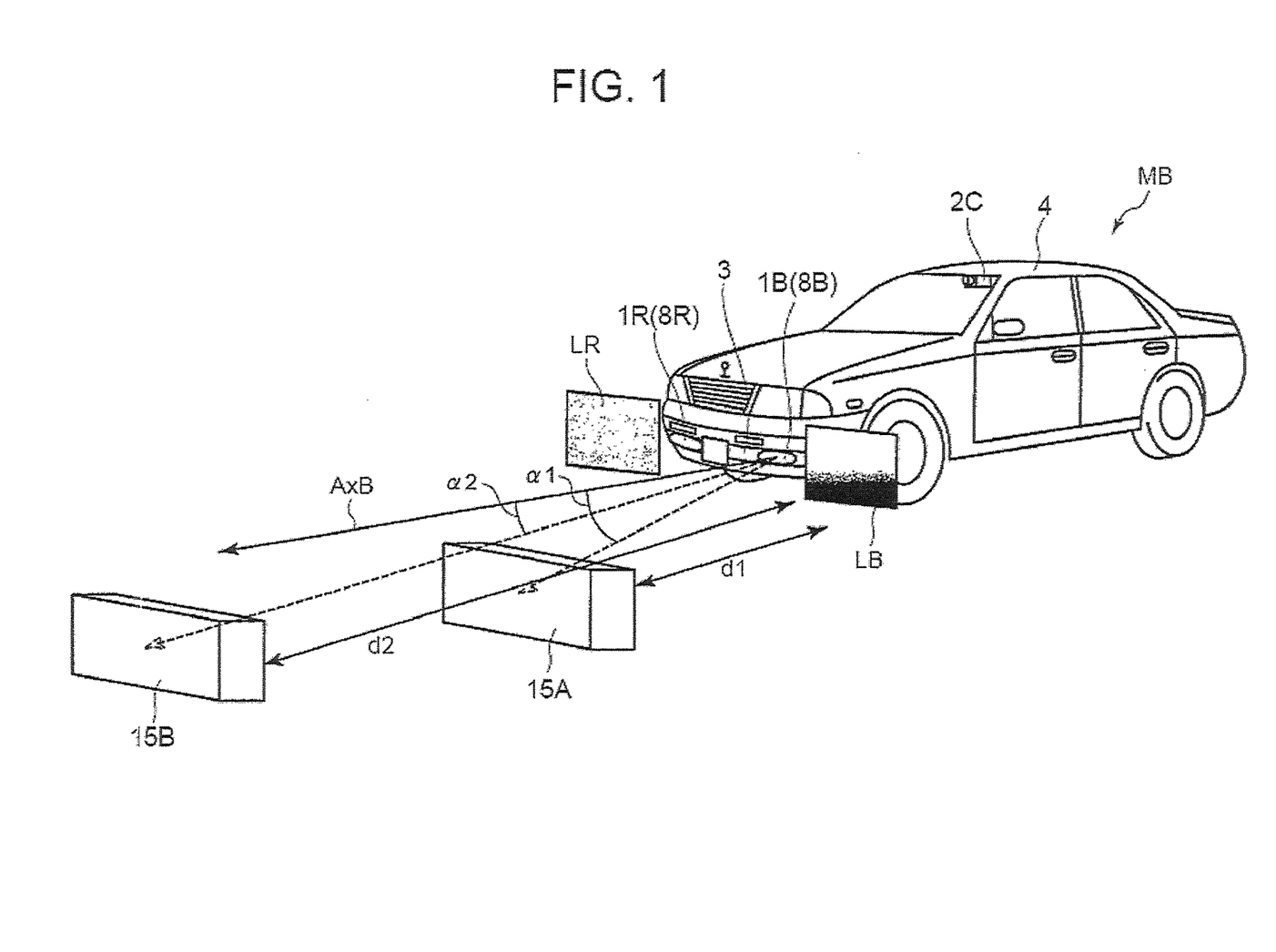
FIG. 1 is an oblique view illustrating a vehicle having a distance measurement device carried onboard it as an example of an embodiment of the invention.

FIGS. 1-7 illustrate one embodiment of the distance measurement device of the invention. In this embodiment, the invention is adopted in a distance measurement device equipped on a sedan or other vehicle. FIG. 1 is a diagram illustrating vehicle MB with the distance measurement device of the present embodiment carried on it. This distance measurement device has first light projector 1B and second light projector 1R, camera 2C and control unit CU shown in FIG. 4. The space ahead of the vehicle is taken as the measurement object space, and the light projectors 1B, 1R irradiate light beams for measurement on the measurement object space. The camera 2C detects the reflected light from the object in the measurement space (including mirror surface reflected light and scattered light). The control unit CU uses the detection information of camera 2C to measure the distance information of the object (including the shape information).

As shown in FIG. 1, first light projector 1B and second light projector 1R are set near the left end portion and the right end portion of front bumper 3 of vehicle MB, and they emit irradiating light beams LB and LR with a prescribed illuminance distribution on the measurement object space, with the irradiating light beams superimposed with each other. The camera 2C is attached near the upper central portion of the front glass, that is, near the cab mirror (not shown in the figure) on the central inner side of the front end portion of roof 4. The camera 2C has a color image pickup element as a two-dimensional array of plural pixels of a CCD or CMOS. The camera 2C receives each of the plural color components of the reflected light from the object irradiated with the irradiating light beams emitted from light projectors 1B, 1R to obtain a color image. Also, light projectors 1B, 1R may be set at the same position.

Figure 2:
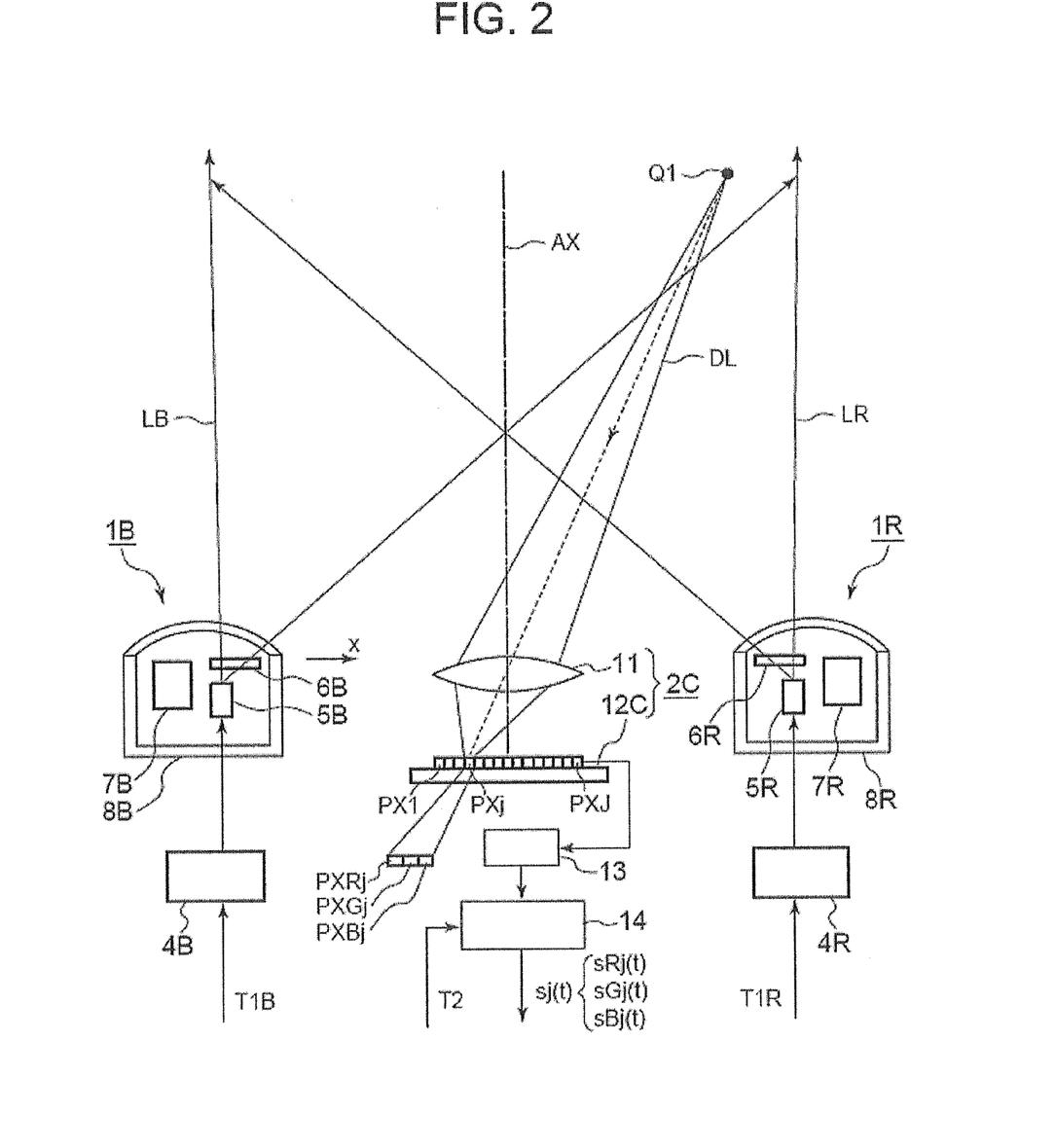
FIG. 2 is a partially cut plan view illustrating the optical system of the distance measurement device in the embodiment of FIG. 1.

FIG. 2 is a plan view illustrating the configuration of light projectors 1B, 1R and camera 2C shown in FIG. 1. As shown in FIG. 2, left-side light projector 1B has blue light source 5B, density filter 6B and driving part 4B. Blue light source 5B contains a light emitting diode (LED) and a lens, and it emits blue (wavelength of 470 nm) irradiating light beam LB at a prescribed angle. Density filter 6B is set such that the variation rate of the distribution of illuminance of irradiating light beam LB gradually varies corresponding to the irradiation angle to be explained later. Driving part 4B has blue light source 5B emit a pulsed light beam.

Right-side light projector 1R has red light source 5R, homogenizing filter 6R and driving part 4R. Red light source 5R emits red (wavelength of 680 nm) irradiating light beam LR with approximately the same angle as irradiating light beam LB. Homogenizing filter 6R sets the illuminance distribution of irradiating light beam LR to a nearly uniform distribution of the variation rate with respect to the irradiation angle to be explained later. Driving part 4R has red light source 5R emit a pulsed light beam.

Figure 4:
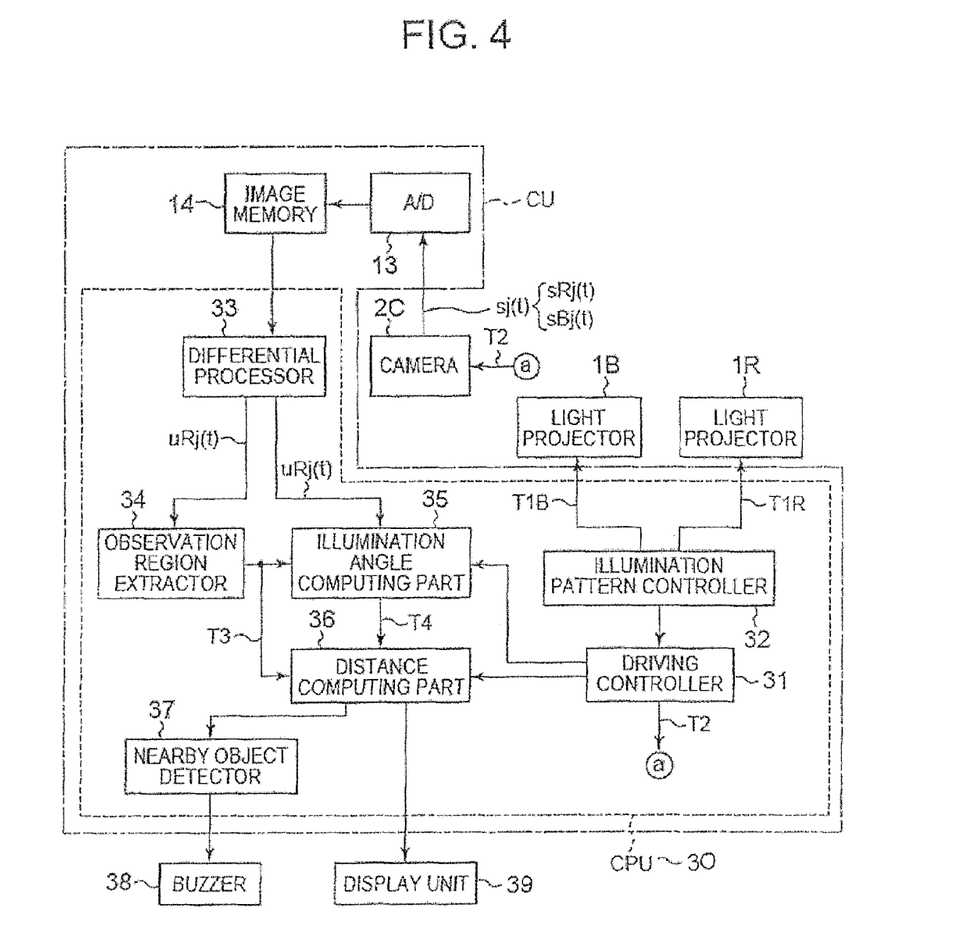
FIG. 4 is a block diagram illustrating the constitution of control unit CU in the embodiment of FIG. 1.

Driven by driving parts 4B, 4R and by means of irradiation control signals T1B, T1R from control unit CU shown in FIG. 4, irradiated light beams LB, LR from light projectors 1B, 1R are simultaneously emitted as pulses. Irradiation control signals T1B, T1R are fed from irradiation pattern control part 32 of control unit CU.

As shown in FIG. 2, irradiated light beams LB and LR from left/right light projectors 1B, 1R are formed nearly superposed with each other to illuminate the measurement object space ahead of the vehicle MB. As a result, the various objects ahead of the vehicle are irradiated by superposed pulse light beams of irradiated light beams LB and LR, and the images of the irradiated light beams LB and LR reflected from the various objects are taken by camera 2C.

As shown in FIG. 2, camera 2C has objective lens 11 having optical axis AX and image pickup element 12C for color image pickup. The plural pixels of image pickup element 12C are set in a two-dimensional configuration. In FIG. 2, however, only the J (J is an integer of 2 or larger) pixels PXj (j=1–J) set on the kth horizontal line can be seen. Below, the processing of image pickup signal sj(t) of pixel PXj on the kth horizontal line will be explained. The same processing is performed for the image pickup signals of the pixels on the other lines.

In this case, each pixel PXj comprises red pixel PXRj for detecting the illuminance of red light, green pixel PXGj for detecting the illuminance of green light and blue pixel PXBj for detecting the illuminance of blue light. Image pickup signal sj(t) comprises image pickup signals sRj(t), sGj(t) and sBj(t) corresponding to red, green and blue images.

In the state shown in FIG. 2, when irradiated light beams LB and LR from light projectors 1B, 1R are irradiated on observation point Q1 on the object, reflected light DL from observation point Q1 (reflected light of the superimposed light of irradiated light beams LB and LR) is incident on pixel PXj. Similarly, the reflected light from other points on the object irradiated with irradiated light beams LB and LR superimposed with each other is incident on corresponding pixels on image pickup element 12C, and the image of the object is picked up. In this case, the image pickup angle as the angle with respect to optical axis AX of the incident light beam is made to correspond to each pixel beforehand. Also, as shown in FIG. 2, the lateral direction of the vehicle, that is, the direction perpendicular to optical axis AX and parallel to the road surface is taken as the x-direction.

As shown in FIG. 4, control unit CU has CPU 30, A/D converter 13 that performs A/D conversion for the image pickup signal from camera 2C and image memory 14 that stores the image pickup signal that has been converted by A/D converter 13. CPU 30 comprises driving control part 31, irradiation pattern control part 32, difference processing part 33, observation region extracting part 34, irradiation angle computing part 35, distance computing part 36 and nearby object detecting part 37.

Illumination pattern control part 32 is synchronized with camera control signal T2 from driving control part 31, such that irradiation control signal T1B is fed to light projector 1B, and irradiation control signal TIR is fed to light projector 1R, so that light projectors 1B, 1R are driven under control.

As will be explained below, based on camera control signal T2, while light projectors 1B, 1R are turned off, CPU 30 acquires a reference image picked up for the space ahead of the vehicle by camera 2C and stores the reference image in image memory 14. For example, CPU 30 reads image pickup signal sj(t) from each pixel PXj of image pickup element 12C and stores the signal via A/D converter 13 in image memory 14. Similarly, while light pulses are irradiated from light projectors 1B, 1R, the detected image picked up by camera 2C is acquired, and the detected image is stored in image memory 14. CPU 30 reads the reference image signal and the detected image signal from image memory 14. Here, for each reference image signal and detected image signal stored in image memory 14, image pickup signal sj(t) (image pickup information) and the time sequence for each pixel PXj is read. Details of the various parts of the CPU will be explained later.

In this embodiment, the irradiated light beams LB and LR are of blue and red colors, respectively. Consequently, in control unit CU, only image pickup signals sRj(t), sBj(t) of read and blue images in image pickup signal sj(t) are used.

Figure 3A:
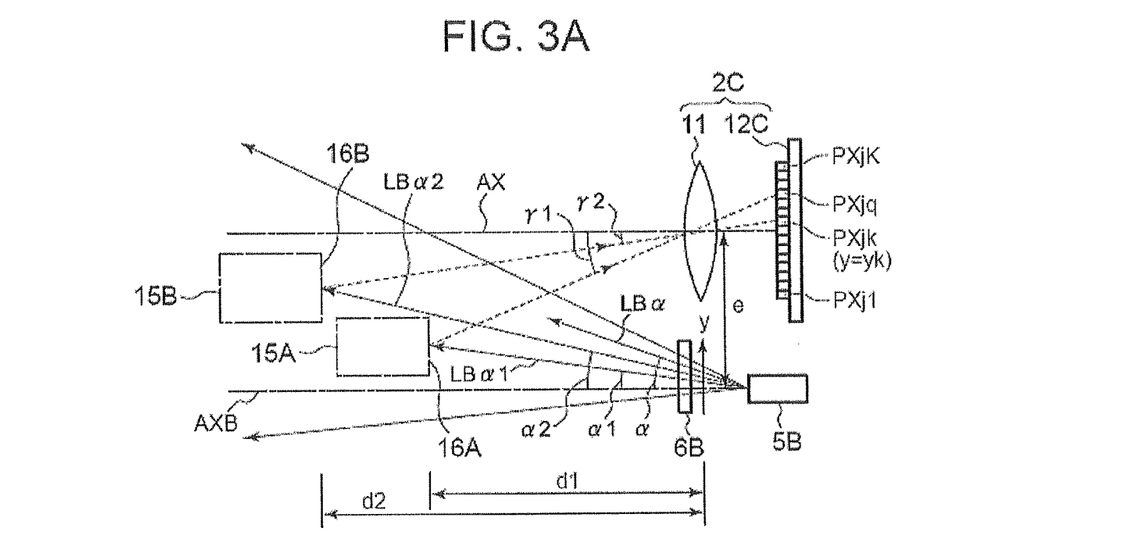
FIG. 3A is a side view illustrating the constitution of light projector 1B on the left side of the distance measurement device and camera 2C of the embodiment of FIG. 1.

FIG. 3A is a side view illustrating blue light source 5B, density filter 6B and camera 2C of light projector 1B shown in FIG. 2. In FIG. 3A, the direction perpendicular to the road surface is taken as the y-direction, and the vertical line of image pickup element 12C extends in the y-direction. In FIG. 3A, the K (K is an integer of 2 or larger) pixels PXjk (actually comprising red, green and blue pixels) (k=1–K) set on the jth vertical line of image pickup element 12C can be seen. In the following explanation, treatment of the pixel signal of pixel PXjk will be presented. However, the same treatment is performed for the image pickup signals of the other pixels on the vertical line. In this case, the y-coordinate of the kth pixel PXjk on each vertical line is denoted as yk.

As shown in FIG. 3A, irradiating axis AXB of light projector 1B and blue light source 5B, is set parallel to optical axis AX of camera 2C. Also, in FIG. 3A, objects 15A,15B are located at different distances ahead of camera 2C. The surfaces of objects 15A, 15B facing camera 2C are taken as detected surfaces 16A, 16B. In this case, of the irradiating light emitted from blue light source 5B, the light beam at irradiation angle α is called irradiating light beam LBα. The light beams at irradiating angles α1, α2 irradiating near the centers of detected surfaces 16A, 16B are called irradiating light beams LBα1, LBα2. Here, the irradiation angle is the angle formed with irradiating axis AXB.

The light reflected from detected surfaces 16A, 16B due to irradiating light beams LBα1, LBα2 is incident on pixels PXjq and PXjk of image pickup element 12C of camera 2C. In this case, the optical axes of the light reflected from detected surfaces 16A, 16B are at angles γ1, γ2 with respect to optical axis AX. This angle is called the image pickup angle. When the spacing between camera 2C and blue light source 5B in the y-direction is e, from the principle of triangulation, distances d1, d2 from camera 2C to detected surfaces 16A, 16B can be approximately computed using the following formulas:

$$d1 = e/(\tan \cdot \alpha 1 + \tan \cdot \gamma 1); \text{ and} \quad (1A)$$

$$d2 = e/(\tan \cdot \alpha 2 + \tan \cdot \gamma 2). \quad (1B)$$

Also, by computing distances d1, d2 by considering the spacing between camera 2C and blue light source 5B in the direction of optical axis AX, it is possible to compute distances d1, d2 more accurately.

It is possible to determine image pickup angles γ1, γ2 from the information of the positions of pixels PXjq and PXjk receiving the reflected light from detected surfaces 16A, 166B (here, y-coordinates yq, yk) by taking a prescribed table as a reference. However, irradiation angles α1, α2 of irradiating light beams LBα1, LBα2 corresponding to the reflected light cannot be determined by simply specifying the position of the pixel receiving the reflected light, so formula (1A) and formula (1B) cannot be adopted.

In the present embodiment, by using density filter 6B to change the variation rate of the illuminance of the irradiating light corresponding to irradiation angle α, it is possible to determine corresponding irradiation angles α1, α2 from the images of detected surfaces 16A, 16B by camera 2C.

Figure 3B:
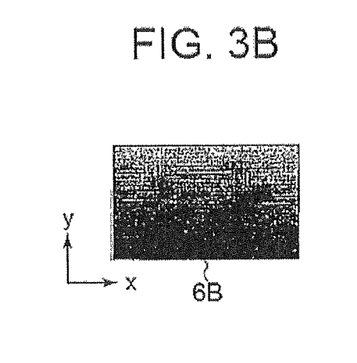
FIG. 3B is a graph illustrating density filter 6B.

FIG. 3B is a diagram illustrating the distribution of the transmissivity of density filter 6B. Assume that the light intensity distribution of the irradiating light from blue light source 5B shown in FIG. 3A is uniform independent of the irradiating direction. Then, when the transmissivity of density filter 6B shown in FIG. 3B is constant in the x-direction, the transmissivity rises according to a nearly quadratic function in the y-direction.

Figure 3C:
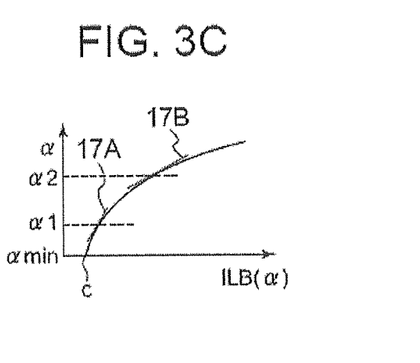
FIG. 3C is a graph illustrating the distribution of illuminance of irradiating light beam LB.

FIG. 3C is a graph obtained using density filter 6B illustrating the characteristics of illuminance ILB(α) of irradiating light beam LBα shown in FIG. 3A with respect to irradiation angle α at a position that is a unit distance away from filter 6B. As shown in FIG. 3C and the following formula, by using minimum value αmin of the irradiation angle, prescribed offset c and coefficient h, illuminance ILB(α) can be represented as a quadric function of irradiation angle α by following formula:

$$ILB(\alpha) = h(\alpha - \alpha min)^2 + c. \tag{2A}$$

FIG. 3C is a graph obtained using density filter 6B illustrating the characteristics of illuminance ILB(α) of irradiating light beam LBα shown in FIG. 3A with respect to irradiation angle α at a position that is a unit distance away from filter 6B. As shown in FIG. 3C and the following formula, by using minimum value αmin of the irradiation angle, prescribed offset c and coefficient h, illuminance ILB(α) can be represented as a quadric function of irradiation angle α by following formula:

$$ILB(\alpha) = h(\alpha - \alpha min)^2 + c. \tag{2A}$$

In this case, variation rate dILB/dα of illuminance ILB(α) is represented by the following formula (2B). As can be seen from formula (2B), variation rate dILB/dα varies linearly with reference to irradiation angle α.

$$dILB/d\alpha = 2h(\alpha - \alpha min). \tag{2B}$$

For irradiation angle α of different values α1 and α2, this variation rate also has different values as indicated by the slopes of tangential lines 17A and 17B in FIG. 3C. In this embodiment, it is possible to determine the irradiation angle of the irradiating light on the corresponding detected surface based on the variation rate in the y-direction of the image pickup signal (luminance level) in the image picked up by camera 2C. In this case, because irradiating light beam LR after passing through homogenizing filter 6R shown in FIG. 2 is simultaneously irradiated with irradiating light beam LB, the distribution of illuminance of irradiating light beam LR will now be explained.

Figure 3D:
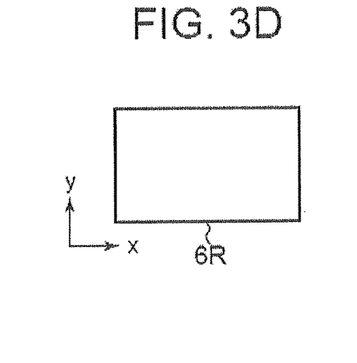
FIG. 3D is a graph illustrating homogenizing filter 6R.

FIG. 3D is a diagram illustrating the distribution of the transmissivity of homogenizing filter 6R shown in FIG. 2. Assume that the distribution in the light intensity of the irradiating light emitted from red light source 5R shown in FIG. 2 is uniform independent of the irradiating direction. Then, when the transmissivity of homogenizing filter 6R shown in FIG. 3D is constant independent of the x-direction, the transmissivity rises almost linearly in the y-direction.

Figure 3E:
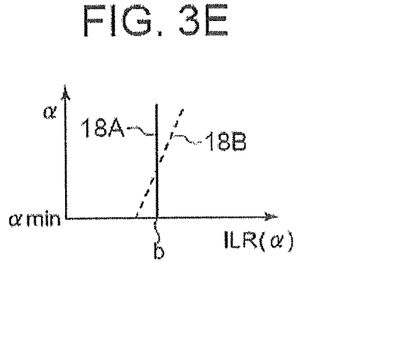
FIG. 3E is a graph illustrating the distribution of illuminance of irradiating light beam LR.

FIG. 3E is a graph obtained using homogenizing filter 6R illustrating the characteristics of illuminance ILR(α) versus irradiation angle α (the angle formed between optical axis AX and red light source 5R) at a position that is a unit distance away from filter 6R for irradiating light beam LR shown in FIG. 2. Curve 18B in FIG. 3E is a linear function of irradiation angle α using prescribed coefficients a and b, and it is represented by following formula:

$$ILR(\alpha) = a \cdot \alpha + b. \tag{3A}$$

Consequently, variation rate dILR/dα of illuminance ILR(α) versus irradiation angle α is represented by formula (3B). As can be seen from formula (3B), variation rate dILR/dα is a constant coefficient a as shown below and is independent of irradiation angle α.

$$dILR/d\alpha = a. \tag{3B}$$

Here, coefficient a may be 0. In this case, illuminance ILR(α) has a constant value of b as shown by solid line 18A in FIG. 3E.

In FIG. 3A, in order to facilitate explanation, irradiation angles α1, α2 of the irradiating light with respect to objects 15A, 15B are shown upward with respect to the horizontal direction. However, in practice, as shown in FIG. 1, irradiation angles α1, α2 are a little downward with respect to the horizontal direction. That is, irradiated light beams LB and LR from light projectors 1B, 1R are set such that the illuminance gradually increases from a prescribed downward angle to the horizontal direction, and there is little irradiation at angles over the horizontal direction. By such setting with the maximum illuminance in the horizontal direction, even for a vehicle running on the road that is far away, the distance can be measured correctly.

Below, an explanation will be given regarding the principle of the irradiation angle of irradiating light beam LR irradiated on objects 15A, 15B shown in FIG. 1.

As shown in FIG. 1, when irradiating light beam LR emitted from light projector 1R is irradiated on objects 15A, 15B at distances d1, d2, illuminances IrR1, IrR2 on objects 15A, 15B are as shown in formulas (4A) and (4B):

$$IrR1 = (a \cdot \alpha 1 + b)/(d1)^2; \text{ and} \tag{4A}$$

$$IrR2 = (a \cdot \alpha 2 + b)/(d2)^2. \tag{4B}$$

Luminances LevR1, LevR2 of the red images of objects 15A, 15B obtained from the reflected light of irradiating light beam LR by means of camera 2C are represented by following formulas (5A), (5B) assuming that the reflectivities of objects 15A, 15B to the red light are r1, r2, respectively. Here, function f{ } is a sensitivity characteristic function of camera 2C:

$$LevR1 = f\{(a \cdot \alpha 1 + b)r1/(d1)^2\}; \text{ and} \tag{5A}$$

$$LevR2 = f\{(a \cdot \alpha 2 + b)r2/(d2)^2\}. \tag{5B}$$

Variation rates dLevR1/dα, dLevR2/dα pertaining to irradiation angle α of luminances LevR1, LevR2 of the red images picked up by camera 2C are proportional to the irradiation angle and the position of the pixel, so they are represented by the following formulas:

$$\text{Lev}R1/d\alpha = f\{a \cdot r1/(d1)^2\}; \text{ and} \quad (6A)$$

$$d\text{Lev}R2/d\alpha = f\{a \cdot r2/(d2)^2\}. \quad (6B)$$

Consequently, when the region where the variation in luminance of red images in space is uniform, that is, the observation region where the variation rates of luminance in the x-direction and the y-direction is the same within a tolerable range, is extracted, and the region where the value of the ratio of reflectivity r to the square of distance d ($=r/d^2$) is constant, that is, the region where the distance to the object is constant and the reflectivity is the same, is extracted. In this way, by extracting the observation region where the variation rate of the luminance in space is extracted from the image of irradiating light beam LR, it is possible to identify the images of detected surfaces (16A), (16B) shown in FIG. 3A.

On the other hand, when irradiating light beam LB having the distribution of illuminance of formula (2A) from light projector 1B shown in FIG. 1 is irradiated on object 15A, luminance LevB1 of the blue image obtained from the reflected light from object 15A by means of camera 2C is as follows:

$$\text{Lev}B1 = f[\{h(\alpha - \alpha \min)^2 + c\} rB1/(d1)^2]; \text{ wherein} \quad (7)$$

rB1 represents the reflectivity for blue light.

Also, variation rate $d\text{Lev}B1/d\alpha$ of luminance LevB1 of the blue image of object 15A versus irradiation angle $\alpha$ is represented by the following formula:

$$d\text{Lev}B1/d\alpha = f[\{2h(\alpha - \alpha \min)\} rB1/(d1)^2]. \quad (8)$$

Because the value of the ratio of the reflectivity to the square of the distance in the observation region on the image of camera 2C is constant, and assuming that $2h \cdot rB1/(d1)^2$ is represented by H1, $d\text{Lev}B1/d\alpha$ can be represented as follows:

$$d\text{Lev}B1/d\alpha = f\{H1(\alpha - \alpha \min)\}. \quad (9)$$

Consequently, variation rate $d\text{Lev}B1/d\alpha$ of the luminance versus irradiation angle $\alpha$ has a value uniquely depending on irradiation angle $\alpha$. Because sensitivity characteristics function f of camera 2C is known, the variation rate of the luminance of the blue image corresponding to variation rate $d\text{Lev}B1/d\alpha$ versus the y-coordinate is determined from the blue image, and, by comparing this value with formula (2B), it is possible to specify irradiation angle $\alpha 1$.

FIG. 4 is a diagram illustrating control unit CU for determining distance information for an object ahead of the vehicle by processing the image pickup signal of camera 2C, with the operation of light projectors 1B, 1R and camera 2C shown in FIG. 2 under control. As shown in FIG. 4, control unit CU is a controller having RAM-containing image memory 14, ROM, CPU 30, A/D converter 13, etc. The processing part allotted to the various blocks in CPU 30 shown in FIG. 4 has a function of execution by the software of the computer. Here, the various processing parts can alternatively be realized by a combination of logic circuits, etc. (hardware).

As mentioned briefly above, CPU 30 has the following parts. Driving control part 31 performs overall control of the operation of the entire device, and irradiation pattern control part 32 feeds irradiation control signals T1B, T1R to light projectors 1B, 1R shown in FIG. 2. CPU 30 also includes difference processing part 33, observation region extracting part 34, irradiation angle computing part 35, distance computing part 36 and nearby object detecting part 37. First, via the irradiation pattern control part 32, driving control part 31 simultaneously reads irradiating light beam LB and red irradiating light beam LR emitted from light projectors 1B, 1R as pulses, and camera 2C is used to perform a first round of image pickup. Then, while there is no irradiation from light projectors 1B, 1R, a second round of image pickup is performed by camera 2C. When reflected light is detected due to irradiated light beams LB and LR reflected from the space ahead of the vehicle as shown in FIG. 2, this configuration can remove the influence of background light.

Image pickup signals sj(t) of each pixel obtained by image pickup using camera 2C in these two rounds of operation are stored as reference image signals and detection image signals in image memory 14. Of them, image pickup signals sRj(t), sBj(t) corresponding to red and blue images are fed to difference processing part 33. In difference processing part 33, in order to determine the image of the reflected light of irradiating light beam LR with constant variation rate of the illuminance shown in FIG. 2, image pickup signal uRj(t) of the difference of the two rounds of image pickup signals sRj(t) for each red pixel is determined, and the image pickup signal is sent to observation region extracting part 34. In addition, for difference processing part 33, in order to determine the image of the reflected light of irradiating light beam LB with the variation rate of illuminance varying corresponding to irradiation angle $\alpha$ as shown in FIG. 2, image pickup signal uBj(t) of the difference between the two rounds of image pickup signals sBj(t) for each blue pixel is determined, and the image pickup signal is fed to irradiation angle computing part 35.

Figure 5:
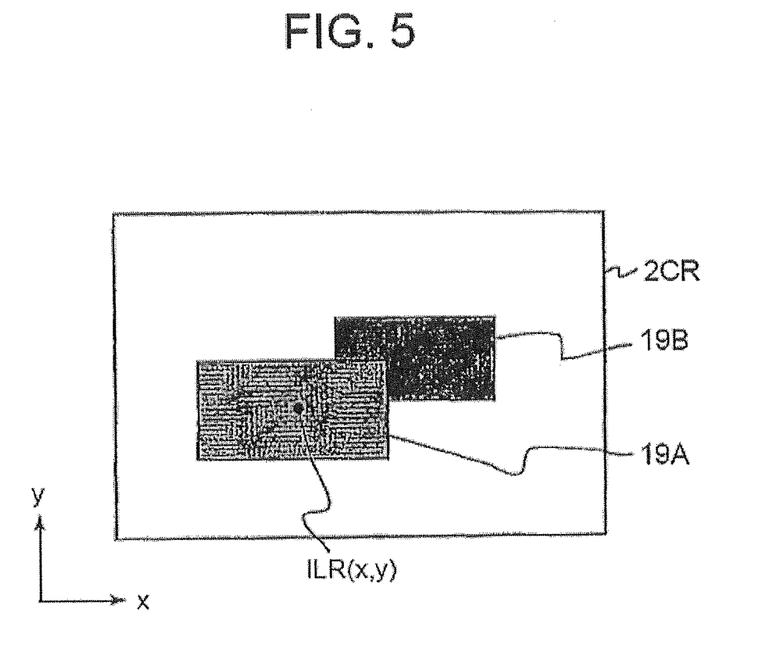
FIG. 5 is a diagram illustrating an image generated by irradiating light beam LR shown in FIG. 1.

In observation region extracting part 34, the fed image pickup signal uRj(t) is used to extract as the observation region of the image for which the variation rate in the luminance in the x-direction and the y-direction is within a prescribed tolerable range (with a dispersion of, e.g., 10% with respect to the average value) and can be taken as constant in red image 2CR of camera 2C shown in FIG. 5. In the case shown in FIG. 1, in image 2CR shown in FIG. 5, the variation rate of luminance ILR(x,y) in horizontal coordinate x and vertical coordinate y is taken as constant within a tolerable range, and two observation regions 19A, 19B are extracted corresponding to the detected surfaces of objects 15A, 15B. Coordinate information T3 indicating the position of the plural pixels belonging to observation regions 19A, 19B is fed to irradiation angle computing part 35 and distance computing part 36 shown in FIG. 4.

Figure 6A:
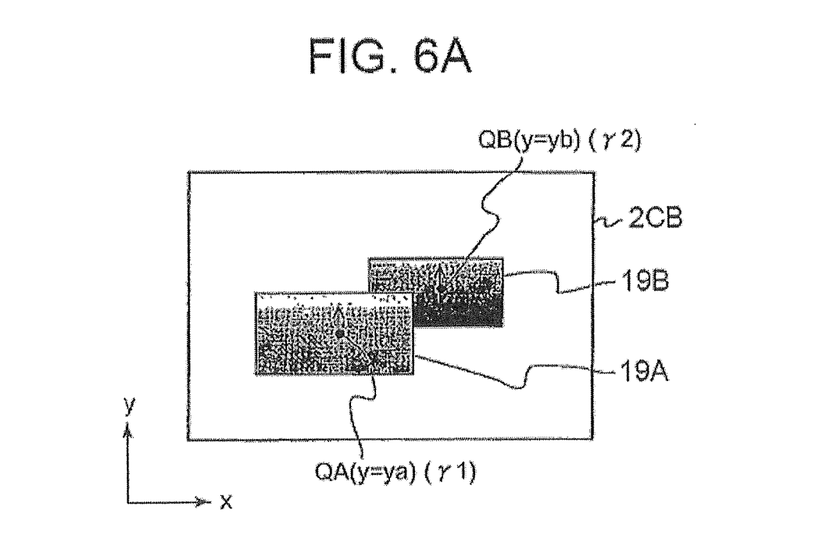
FIG. 6A is a graph illustrating an image generated by irradiating light beam LB shown in FIG. 1.

In irradiation angle computing part 35, based on fed coordinate information T3, in blue image 2CB of camera 2C shown in FIG. 6A, the reference points for computing the irradiation angle in two observation regions 19A, 19B in FIG. 5, that is, central portions QA and QB, are specified. Also, a point in blue image 2CB is a region corresponding to one pixel (here, blue pixel) of camera 2C. Assuming that the y-coordinates of central portions QA and QB are ya and yb, image pickup signal uBj(t) of the difference in the blue images is used to determine the difference in the luminance level in the y-direction at the two points that specify central portions QA and QB in irradiation angle computing part 35.

Before computing the difference in the luminance level, for example, one may normalize image pickup signal uBj(t) for observation regions 19A, 19B shown in FIG. 6A by dividing using the average level of image pickup signal uRj(t).

Here, at points QA1, QA2 having composite QA sandwiched in the y-direction in FIG. 6A, the luminance levels of image pickup signal uBj(t) are taken as uBA1, uBA2, and the y-coordinates of points QA1, QA, QA2 are changed for a known $\Delta y$. When variation rate dILB/dy with respect to the y-coordinate of luminance ILB is taken as the value obtained by dividing the difference of luminance ILB by the corresponding variation in the y-coordinate, variation rate dILB/dy of luminance at point QA can be computed as follows:

$$dILB/dy(\text{point } QA)=(uBA2-uBA1)/(2\Delta y). \quad (10A).$$

Similarly, assuming that the points having central portion QB sandwiched in the y-direction are QB1, QB2 (not shown in the figure), and assuming that the luminance levels of image pickup signal uBj(t) at points QB1, QB2 are uBB1, uBB2, variation rate dILB/dy of the luminance at point QB can be computed as follows:

$$dILB/dy(\text{point } QB)=(uBB2-uBB1)/(2\Delta y). \quad (10B).$$

Figure 6B:
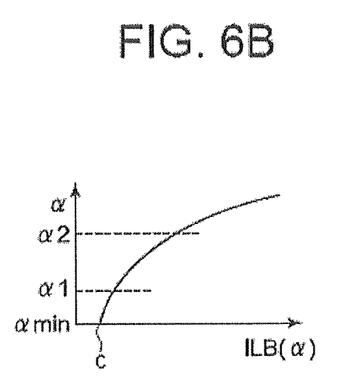
FIG. 6B is a graph illustrating the distribution of the illuminance of irradiating light beam LB.

In this case, illuminance ILB($\alpha$) of irradiating light beam LB with respect to irradiation angle $\alpha$ as shown in FIG. 1 is represented by formula (2A), that is, FIG. 6B, and variation rate dILB($\alpha$)/d$\alpha$ of illuminance ILB($\alpha$) versus irradiation angle $\alpha$ is represented by formula (2B). In the present embodiment, in order to determine the irradiation angle based on the detected image, it is necessary to determine how the luminance level of the blue image versus irradiation angle $\alpha$ varies on the y-axis. Here, variation rate dILB($\alpha$)/d$\alpha$ of illuminance ILB($\alpha$) versus irradiation angle $\alpha$ represented by formula (2B) is converted to variation rate dILB/dy of the luminance level of the blue image versus the y-coordinate using function f{ } indicating the sensitivity characteristics of camera 2C. The variation rate dILB/dy is indicated by straight line 20 shown in FIG. 6C. The slope of the straight line 20, that is, the value indicating the variation in irradiation angle $\alpha$ with respect to the variation in variation rate dILB/dy of the abscissa is pre-stored in a storage part in irradiation angle computing part 35 shown in FIG. 4.

Figure 6C:
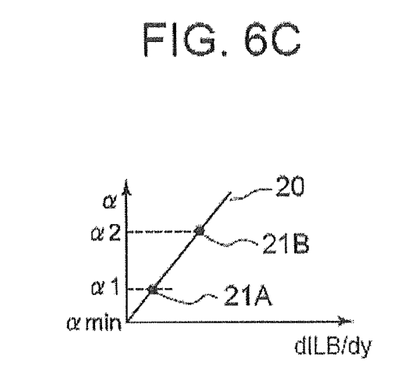
FIG. 6C is a graph illustrating the relationship between the variation rate in the luminance on the image and the irradiation angle.

In irradiation angle computing part 35, points 21A and 21B where the values of variation rate dILB/dy of the luminance computed using formulas (10A) and (10B) become the values of the abscissa shown in FIG. 6C are specified. Irradiation angles $\alpha$1, $\alpha$2 on the ordinate corresponding to said points 21A and 21B are determined. The irradiation angles $\alpha$1, $\alpha$2 are the irradiation angles of irradiating light beams LB$\alpha$1, LB$\alpha$2 from light projector 1B shown in FIG. 1 incident on central portions QA and QB of observation regions 19A, 19B shown in FIG. 6A. The coordinates of central portions QA and QB of observation regions 19A, 19B and irradiation angle information T4 containing irradiation angles $\alpha$1, $\alpha$2 corresponding to these coordinates are fed to distance computing part 36.

In the distance computing part 36, from coordinate information T3 fed from observation region extracting part 34, the coordinates of the points belonging to observation regions 19A, 19B are recognized. In addition, in distance computing part 36, the coordinates of the reference points in the observation regions 19A, 19B are extracted from irradiation angle information T4, and, from the coordinates, image pickup angles $\gamma$1, $\gamma$2 of the reflected light incident onto camera 2C shown in FIG. 3A at the reference points are determined. Then, in distance computing part 36, irradiation angles $\alpha$1, $\alpha$2 of irradiating light beam LB incident on the reference points in observation regions 19A, 19B are extracted from irradiation angle information T4. Then, by substituting known interval e in the y-direction between camera 2C and blue light source 5B shown in FIG. 3A as well as image pickup angles $\gamma$1, $\gamma$2 and irradiation angles $\alpha$1, $\alpha$2 into formulas (1A) and (1B), distances d1, d2 to detected surfaces 16A, 16B of FIG. 3A as the object corresponding to observation regions 19A, 19B shown in FIG. 6A are computed by distance computing part 36. The information of the positions of observation regions 19A, 19B in the x-direction and the y-direction, and the information of distances d1, d2 that has been computed are fed to nearby object detecting part 37 and display unit 39.

On display unit 39, the distance information to the regions corresponding to observation regions 19A, 19B on the monitor is displayed. In nearby object detecting part 37, when fed distances d1, d2 are lower than a prescribed tolerable value, an alarm is generated from buzzer 38 to warn the driver. As a result, the driver can act to optimize the inter-vehicle distance.

In the following, an explanation will be given regarding the overall operation with reference to the flow chart shown in FIG. 7. This operation is controlled by driving control part 31 shown in FIG. 4.

Figure 7:
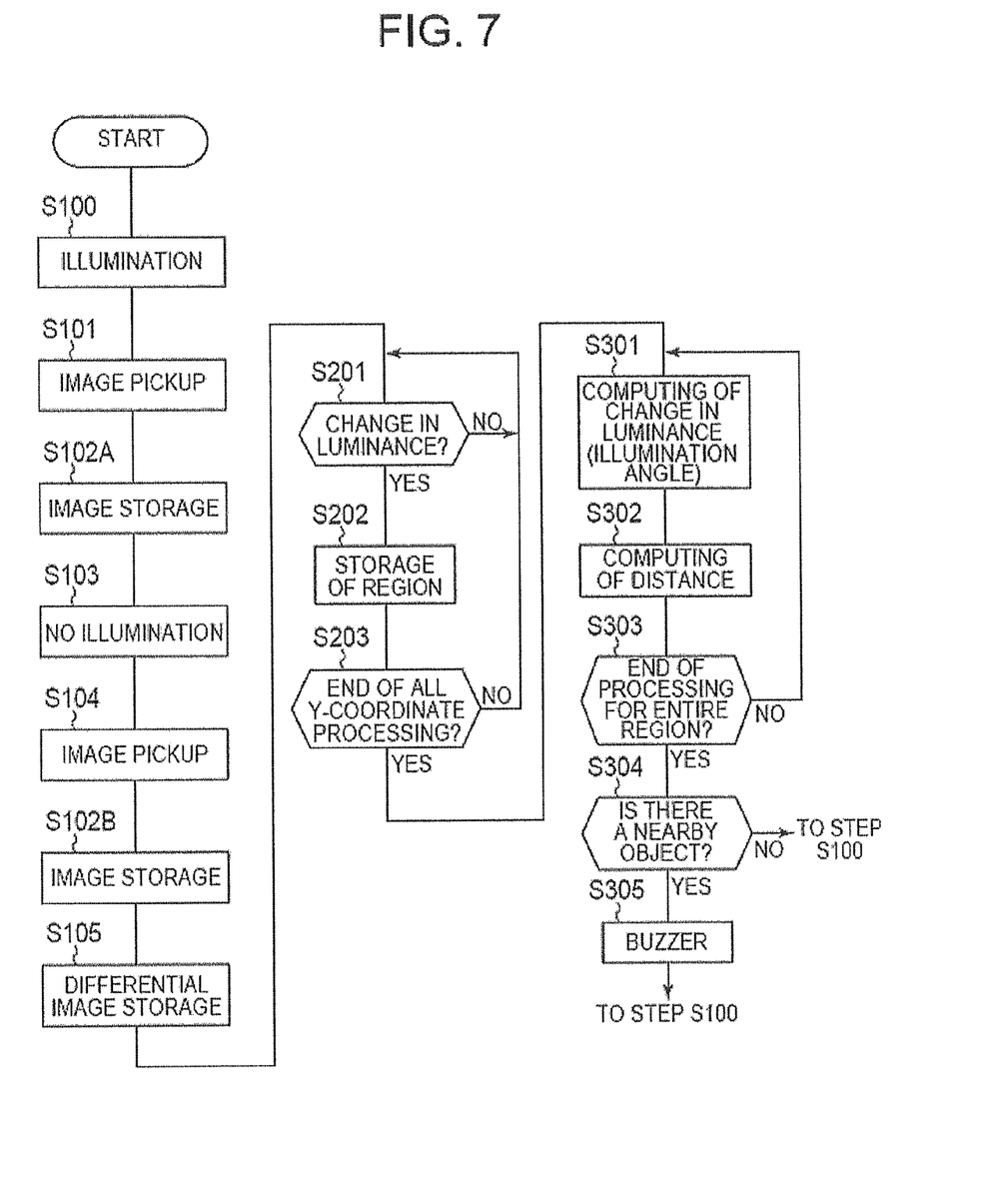
FIG. 7 is a flow chart illustrating an example of the distance measurement operation in the embodiment of FIG. 1.

First, in step S100 shown in FIG. 7, driving control part 31 shown in FIG. 4 controls so that irradiated light beams LB and LR are simultaneously emitted as pulses from light projectors 1B, 1R shown in FIG. 2, and in step S101 image pickup is performed for the reflected light by camera 2C. In this case, the image (image pickup signal) is stored in image memory 14 shown in FIG. 4 (step S102A). Then, in step S103, a state is set in which irradiated light beams LB and LR are not emitted from light projectors 1B, 1R shown in FIG. 2. In step S104, the space ahead of the vehicle is picked up by camera 2C. In this case, the image (image pickup signal) is also stored in image memory 14 shown in FIG. 4 (step S102B). In the next step S105, in difference processing part 33 the red reference image and the blue detected image are read from image memory 14, and difference images obtained as differences between the reference images and the detected images are stored. Also, image pickup signal uRj(t) of the red difference image is fed to observation region extracting part 34, and image pickup signal uBj(t) of the blue difference image is fed to irradiation angle computing part 35.

In next step S201, observation region extracting part 34 shown in FIG. 4 determines the variation rate (because the variation rate in the y-direction cannot be computed on the first horizontal line) in the x-direction of the luminance level of image pickup signal uRj(t) of the corresponding difference image for each red pixel of each horizontal line from the lower (smaller y-coordinate) horizontal line towards the upper horizontal line of red image 2CR shown in FIG. 5. Coordinates in agreement with each other in the tolerable range of the variation rate are stored in a storage device as coordinates belonging to the same observation region (specification of the observation region where the pixels belong).

In step S201, if pixels are present that have variation rates of the luminance level in the x-direction within the tolerable range that do not agree with each other, a new observation region is deemed to exist, and the process goes to step S202. The variation rate of the luminance level up to that time is stored in the storage device (storage of the observation region) as the coordinates of one observation region of a group of pixels in the tolerable range.

In next step S203, judgment is made on whether processing for the pixels of all of the horizontal lines (all y-coordinates) of image 2CR shown in FIG. 5 has come to an end. If NO, the process returns to step S201. Then, for the pixels of the horizontal line in processing, the observation region where the variation rates of the luminance level in the x-direction and the y-direction are in agreement with each other within the tolerable range is specified. If there is no observation region having such an agreement, the process goes to step S202, and the observation regions obtained up to that point are stored. In this way, by performing steps of operation S201 and S202 repeatedly, it is possible to classify and extract observation regions 19A, 19B as shown in FIG. 5.

In step S203, after completion of processing of the pixels of all of the y-axis of image 2CR in FIG. 5, the process goes to step S301. In step S301 irradiation angle computing part 35 in FIG. 4 determines the variation rate of the luminance level of the image pickup signal with respect to the y-coordinate for each of observation regions 19A, 19B in blue image 2CB shown in FIG. 6A, and, from the variation rate and straight line 20 shown in FIG. 6C, the irradiation angle of irradiating light beam LB corresponding to the variation rate is determined. In the next step S302, distance computing part 36 shown in FIG. 4 uses the information of the irradiation angle and the information of the image pickup angle corresponding to the reference points in observation regions 19A, 19B to compute distances d1, d2 up to observation regions 19A, 19B. Computing of the distance is performed repeatedly in step S303 until completion of computing of the distances of all of observation regions 19A, 19B.

After completion of computing of the distances for all of observation regions 19A, 19B, in step S304, whether there is a nearby object is judged by means of nearby object detecting part 37 shown in FIG. 4. If NO, the process returns to step S100, and distance measurement is performed repeatedly. In step S304, if a nearby object exists the process goes to step S305. After an alarm is generated by buzzer 38, the process returns to step S100, and the distance measurement is repeated.

For the distance measurement device and vehicle in the present embodiment the following operation and effects can be realized.

The irradiating light beam LR with a nearly constant variation rate of the illuminance with respect to the irradiation angle is irradiated from light projector 1R to ahead of the vehicle, and irradiating light beam LB with a variation rate of the illuminance that differs corresponding to the irradiation angle is irradiated from light projector 1B to ahead of the vehicle. The images of the reflected light from an object ahead of the vehicle are picked up by camera 2C. Observation region extracting part 34 extracts the regions with a nearly constant variation rate of the illuminance (luminance on the image) as observation regions 19A, 19B from red images caused by irradiating light beam LR among the images picked up by camera 2C. The irradiation angle computing part 35 determines the variation rate of the illuminance (luminance) from a blue image under irradiating light beam LB for each of observation regions 19A, 19B extracted by observation region extracting part 34. Irradiation angles α1, α2 of irradiating light beam LB are determined with reference to observation regions 19A, 19B from the variation rate. For observation regions 19A, 19B, the distance computing part 36 computes distances d1, d2 to the objects corresponding to observation regions 19A, 19B based on the irradiation angle determined by irradiation angle computing part 35, the position information (image pickup angles γ1, γ2) on the image by camera 2C of observation regions 19A, 19B, and distance e (position relationship information) between light projector 1B and camera 2C.

Consequently, under irradiation of irradiating light beam LR, the images of plural objects with different reflectivity values and/or distances can be easily classified into plural observation regions 19A, 19B. In addition, because the irradiation angle of irradiating light beam LB for each of observation regions 19A, 19B is determined, quick and correct measurement of the distance to the objects is possible with a simple mechanism according to the principle of triangulation without being influenced by reflectivity and the distance of each object.

Further, in this embodiment difference processing part 33 extracts the computed difference image between the images acquired by means of image pickup using camera 2C when irradiation is performed by light projectors 1B, 1R and by means of image pickup using camera 2C when irradiation from light projectors 1B, 1R is not performed. In observation region extracting part 34 and irradiation angle computing part 35, processing is performed for the computed difference image extracted by difference processing part 33, and the observation region is specified and the irradiation angle is computed. Consequently, correct measurement of the distance to the object is possible without being influenced by the background light.

Here, the light projectors 1B, 1R have red light source 5R and blue light source 5B for irradiating light beams LR and LB, homogenizing filter 6R and density filter 6B. Consequently, the corresponding relationship between irradiating light beams LR, LB and light sources 5R, 5B is one-to-one, and a mechanism for switching filters 6R, 6B with respect to light sources 5R, 5B is not required. The size of the device decreases, and hence the setup cost and operating cost can be decreased.

The irradiating light beams LR, LB have different wavelengths in this embodiment. The irradiating light beams LR, LB are irradiated from light projectors 1B, 1R to ahead of the vehicle, and camera 2C picks up the image of each of plural color components containing the wavelengths of said irradiating light beams LR, LB. Consequently, irradiating light beams LR, LB are simultaneously irradiated on the object, and it is possible to measure the distance to the object. Consequently, it is possible to further shorten the measurement time.

In this embodiment, the variation rate in the illuminance of irradiating light beam LR with respect to the irradiation angle is nearly constant. On the other hand, the variation rate in the illuminance of irradiating light beam LB with respect to the irradiation angle is represented by a quadric function that is different from the linear function. Consequently, it is possible to determine the irradiation angle of irradiating light beam LB irradiated on the object from the image of the object.

In the example shown in FIG. 1, irradiating light beam LB is set such that the illuminance rises as the irradiating direction approaches the horizontal direction. Consequently, when the distance measurement device is carried on the vehicle, the irradiating intensity rises with movement from a close to a distant distance, so long-range measurements are possible.

The vehicle in the present embodiment is a vehicle equipped with the distance measurement device and with light projectors 1B, 1R set on the front side of the vehicle. Consequently, it is possible to measure distance information for objects ahead of the vehicle.

For the distance measurement device taught herein, the following modifications may be adopted.

The blue light source 5B and red light source 5R of light projectors 1B, 1R may be set inside headlight units 8B, 8R. In this case, sites for setting light sources 5B, 5R do not have to be arranged. This is an advantage. In addition, one may also use illumination light sources 7B, 7R in headlight units 8B, 8R concurrently for distance measurement.

It is only required that the irradiating light beam LB and irradiating light beam LR have different wavelengths, and combinations of wavelengths may be selected as desired. For example, one may also use a near-IR light or the like as irradiating light beam LB, and use green light or the like as irradiating light beam LR.

In the scheme above, synchronized with camera control signal T2 from driving control part 31, irradiation control signal T1B is fed to light projector 1B, and irradiation control signal T1R is fed to light projector 1R so as to drive light projectors 1B, 1R. However, the irradiated light beams LB and LR may be set in operation to generate pulsed light emitting with a certain time difference.

In the embodiment, the illuminance of irradiating light beam LB shown in FIG. 2 varies in the form of a quadratic function with respect to irradiation angle α. However, the illuminance of irradiating light beam LB may also vary as a $3^{rd}$ or higher order function, exponential function, or square function or other function that is different from a linear function with respect to irradiation angle α.

Figure 8:
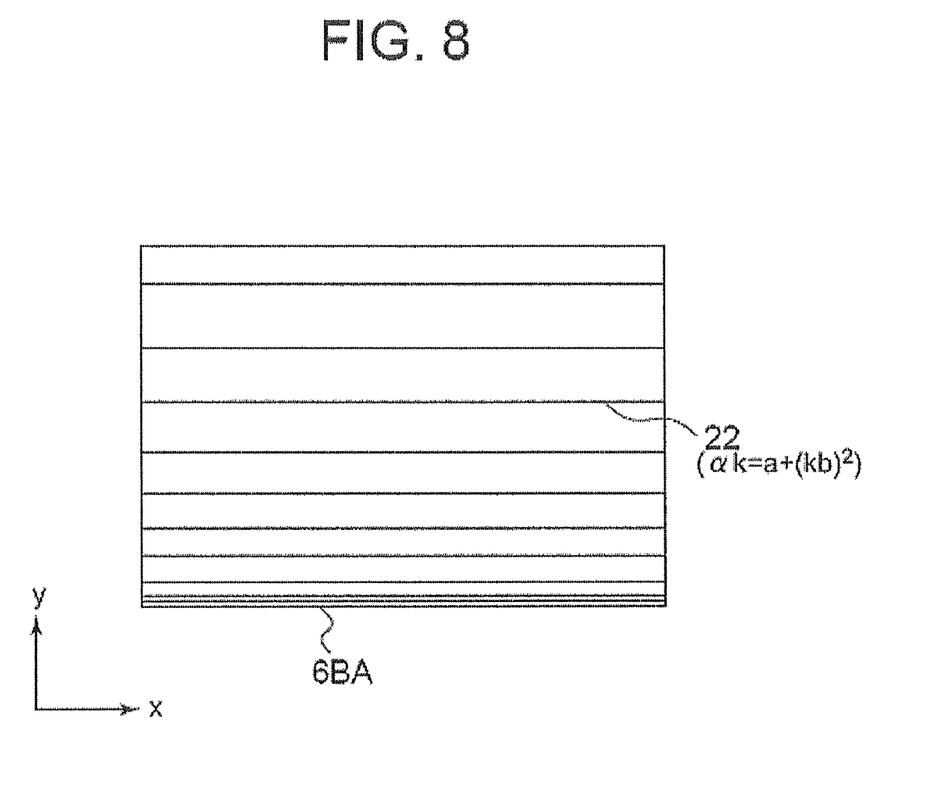
FIG. 8 is a diagram illustrating a modified example of density filter 6B shown in FIG. 2.

As irradiating light beam LB, one may also use plural slit light beams with a prescribed illuminance and prescribed angular width at irradiation angles of uneven spacing, such as irradiation angles αk represented by $(a+(k \cdot b)^2)$, where a and b are coefficients and k is an integer (k=1, 2, ... ). Consequently, instead of density filter 6B shown in FIG. 2, as shown in FIG. 8, filter 6BA, which has transmissive portion 22 with a prescribed width formed at a position corresponding to an irradiation angle αk, and which has the remaining portion as a light blocking portion, may be used.

In this case, as irradiating light beam LR shown in FIG. 2, it is possible to use an irradiating light that has passed through homogenizing filter 6R, or it is possible to use plural slit light beams having a prescribed illuminance at intervals varying uniformly or linearly.

In the embodiment, in order to remove the influence of the background light, difference processing part 33 shown in FIG. 4 is set. However, when the influence of the background light is small, instead of using difference processing part 33, the image pickup signal obtained by camera 2C can also be directly processed by observation region extracting part 34 and irradiation angle computing part 35.

In the embodiment, irradiated light beams LB and LR have different wavelengths. However, one may also adopt irradiated light beams LB and LR of the same wavelength. In this case, for example, first, only irradiating light beam LR is irradiated, and camera 2C performs a first round of image pickup. Then, only irradiating light beam LB is irradiated, and camera 2C performs a second round of image pickup. Without irradiation of either irradiating light beam LR or irradiating light beam LB, camera 2C performs a third round of image pickup. Then, the image difference between the first round and third round of image pickup operation is fed to observation region extracting part 34 shown in FIG. 4, and the image difference between the image of the second round and the image of the third round is fed to irradiation angle computing part 35 shown in FIG. 4. As a result, the distance to an object can be measured just as in the illustrated embodiment.

The measurement procedure may also be adopted if irradiated light beams LB and LR are irradiated from a light source having white LEDs to acquire a monochromic reference image and a monochromic detected image.

When the irradiated light beams LB and LR have the same wavelength, one may also adopt a scheme in which the two share the same light source, and homogenizing filter 6R and density filter 6B in FIG. 2 share the same single liquid crystal shutter or the like. Irradiating light beams LR, LB can be irradiated from the single light source in a time division configuration.

As density filter 6B and homogenizing filter 6R for forming a prescribed illuminance distribution, one may also use a liquid crystal shutter or a Digital Micro-mirror Device (DMD), a type of non-light emitting type image display element (spatial optical modulator) that can control the angles of plural micro-mirrors.

In distance computing part 36 in FIG. 4 in the embodiment, the distance to an object is computed based on the principle of triangulation measurement. However, one may also adopt a scheme with the following features. When the position relationship between light projector 1B and camera 2C is complicated, at plural irradiation angles of irradiating light beam LB and at plural image pickup angles at camera 2C, the distance to the object is computed by means of simulation, and the information is stored as a table. Then, in a practical distance measurement, the table is used for an interpolation computation for irradiation angles not listed in the table, so that the distance to the object is determined.

It is also possible to determine straight line 20 (or a curve) in FIG. 6C by means of actual measurement, For this purpose, for example, irradiating light beam LB from light projector 1B is irradiated on the object for measurement at each of irradiation angles αi (i=1, 2, ... ) with the angular width gradually increased. The images of the reflected light are picked up, and variation rate dILB/dy is actually measured for the luminance of the image versus the y-coordinate. Then, by plotting the actually measured values of variation rate dILB/dy corresponding to the various irradiation angles αi, it is possible to determine straight line 20 shown in FIG. 6C or a curve.

In the embodiment, an example of application of the invention in a distance measurement device carried onboard a vehicle has been presented. However, the invention is not limited to this embodiment. The invention may also be adopted in measurement devices carried on a railway, ship and other transportation facilities, industrial robots, police robots, nursing robots, and other robots, and other industrial equipment as well as other movable devices. In addition, the invention may also be adopted in fixed measurement equipment (including shape measurement devices, etc.).

In addition, as long as the characteristic features of the invention are not degraded, the invention may also be adopted other than in the described embodiment. In addition, this embodiment and modified schemes may be combined.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A distance measurement device, comprising:

a light irradiating part configured to irradiate a first light beam having a constant variation rate of a prescribed characteristic feature with respect to the irradiation angle and a second light beam having different variation rates of said characteristic feature depending on the irradiation angle;

an image pickup part configured to pick up images under irradiation of said light irradiating part;

an object region extracting part configured to extract a region where said variation rate of the characteristic feature is constant as the region where an object is present from the image obtained with said first light beam among the images picked up by said image pickup part;

an irradiation angle information computing part configured to determine a variation of said characteristic feature from the image obtained with said second light beam among said images picked up by said image pickup part, and to determine the irradiation angle information of said second light beam from the variation; and a distance information computing part configured to compute distance information to the object corresponding to said object region for each said object region from the irradiation angle information determined with said irradiation angle information computing part, wherein a position information on the image is determined with said image pickup part of said object region, and the position relationship information between said light irradiating part and said image pickup part.

2. The distance measurement device described in claim 1, further comprising:
a reflected light extracting part configured to extract the images obtained with said first light beam and second light beam by computing a difference between an image picked up by said image pickup part when light irradiation is performed using said light irradiating part and an image picked up by said image pickup part when light irradiation by said light irradiating part is not performed; and wherein, in said object region extracting part and said irradiation angle information computing part, the images extracted by said reflected light extracting part are taken as a processing object.

3. The distance measurement device described in claim 1 wherein
said light irradiating part has a first light source and a second light source emitting said first light beam and second light beam, respectively.

4. The distance measurement device described in claim 1 wherein
said first light beam and second light beam have different wavelengths; and said light irradiating part is configured to irradiate said first light beam and second light beam simultaneously; and wherein said image pickup part picks up an image for each of plural color components.

5. The distance measurement device described in claim 1 wherein
said prescribed characteristic feature is the illuminance, said first light beam has a constant variation rate with respect to the irradiation angle, and said second light beam has a variation rate of illuminance with respect to the irradiation angle represented by a function other than a linear function.

6. The distance measurement device described in claim 5 wherein
the illuminance of said second light beam increases as the irradiating direction approaches the horizontal direction.

7. The distance measurement device described in claim 5 wherein the variation rate of illuminance of said second light beam with respect to the irradiation angle is achieved by passing said second light beam through a density filter with a pre-described distribution of transmissivity.

8. The distance measurement device described in claim 1 wherein
said prescribed characteristic feature is a spacing between plural slit light beams, wherein said first light beam is a light beam with a constant illuminance or plural slit light beams with a constant spacing of the irradiation angle, and said second light beam is plural slit light beams with spacing of the irradiation angle having a gradual variation.

9. The distance measurement device described in claim 1 wherein
said light irradiating part is set on the front side of a vehicle.

10. The distance measurement device described in claim 1 wherein
a light source of headlights of a vehicle is concurrently used as a light source of said light irradiating part.

11. A distance measurement device, comprising:
means for irradiating a first light beam having a constant variation rate of a prescribed characteristic feature with respect to an irradiation angle and a second light beam having different variation rates of said characteristic feature depending on the irradiation angle;
means for picking up images under irradiation of said light irradiating part;
means for extracting a region where said variation rate of the characteristic feature is constant as a region where an object is present from the image obtained with said first light beam among the images picked up by said image pickup part;
means for determining variation of said characteristic feature from the image obtained with said second light beam among said images picked up by said image pickup part, and for determining irradiation angle information of said second light beam from the variation; and
means for computing the distance information to the object corresponding to said object region for each said object region from the irradiation angle information determined with said irradiation angle information computing part, wherein a position information on the image is determined with said image pickup part of said object region, and the position relationship information between said light irradiating part and said image pickup part.

12. A method for distance measurement of an object, comprising:
irradiating a first light beam having a constant variation rate of a prescribed characteristic feature with respect to an irradiation angle and a second light beam having different variation rates of said characteristic feature depending on the irradiation angle;
picking up images under irradiation of said light irradiating part;
extracting a region where said variation rate of the characteristic feature is constant as the region where the object is present from the image obtained with said first light beam among the images picked up by said image pickup part;
determining a variation of said characteristic feature from the image obtained with said second light beam among said images picked up by said image pickup part, and for part;
determining the irradiation angle information of said second light beam from the variation; and
computing the distance information to the object corresponding to said object region for each said object region from the irradiation angle information determined with said irradiation angle information computing part, wherein a position information on the image is determined with said image pickup part of said object region, and the position relationship information between said light irradiating part and said image pickup part.

13. The method according to claim 12, further comprising:
extracting the images obtained with said first light beam and second light beam by computing a difference between an image picked up when light irradiation is performed and an image picked up light irradiation is not performed.

14. The method according to claim 12 wherein said first light beam and second light beam have different wavelengths, the method further comprising:
irradiating said first light beam and second light beam simultaneously; and
picking up an image for each of plural color components.

15. The method according to claim 12 wherein said prescribed characteristic feature is the illuminance, the method further comprising:

irradiating said first light beam at a constant variation rate with respect to the irradiation angle; and irradiating said second light beam at a variation rate of illuminance with respect to the irradiation angle represented by a function other than a linear function.

16. The method according to claim 15, further comprising: increasing the illuminance of said second light beam as the irradiating direction approaches a horizontal direction.

17. The method according to claim 12 wherein said prescribed characteristic feature is a spacing between plural slit light beams, said first light beam is a light beam with a constant illuminance or plural slit light beams with a constant spacing of the irradiation angle, and said second light beam is plural slit light beams with spacing of the irradiation angle having a gradual variation.

18. The method according to claim 12, further comprising: concurrently using a light source of headlights of a vehicle as a light source for irradiating.

19. The method of claim 12 wherein the variation rate of illuminance of said second light beam with respect to the irradiation angle is achieved by passing said second light beam through a density filter with a pre-described distribution of transmissivity.

20. A method of distance measurement of an object, comprising:

irradiating a plurality of light beams having the same predetermined wavelength with a light irradiating part;

picking up an image in a first round under irradiation of the plurality of light beams;

picking up the image in another round without irradiation with a camera;

feeding the difference of the image between the first round and the other round to an observation region extracting part and to an irradiation angle computing part;

outputting a region where a variation rate of a characteristic feature of a light beam of the plurality of light beams is constant using the observation region extracting part;

outputting a distance to the region using the irradiation angle computing part; and computing the distance to the object using the region and the distance to the region.

21. A method for measuring position information of an object, comprising:

irradiating a light beam having a constant variation rate of a prescribed characteristic feature with respect to an irradiation angle;

picking up images under irradiation of said light irradiating light beam;

extracting a region where said variation rate of the characteristic feature is constant as the region where the object is present from the image obtained with said light beam among the images picked up by said image pickup part; and computing the position information of the object using the extracted region.

* * * * *